United States Patent [11] 3,560,743

[72] Inventors John W. Smit
 Rexdale;
 William R. Salt, Kleinburg, Ontario,
 Canada
[21] Appl. No. 673,625
[22] Filed Oct. 9, 1967
[45] Patented Feb. 2, 1971
[73] Assignee Picker X-Ray Mfg., Limited
 Reydale, Canada

[54] X-RAY FILM CHANGER HAVING A STORAGE CHAMBER WITH A WALL WHICH PIVOTS AS CASSETTES ARE FED THERETO
 11 Claims, 11 Drawing Figs.
[52] U.S. Cl. .................................................. 250/66
[51] Int. Cl. ............................................. G03b 41/16

[50] Field of Search .......................................... 250/65, 66, 67

[56] References Cited
 UNITED STATES PATENTS
 3,015,028 12/1961 Clark ........................... 250/66
 2,107,825 2/1938 Humphreys ................. 250/66
 2,617,944 11/1952 Perez ........................... 250/66

Primary Examiner—James W. Lawrence
Assistant Examiner—C. E. Church
Attorney—Watts, Hoffmann, Fisher & Heinke ABSTRACT: Device moving X-ray film cassettes from supply, to exposure, to exposed positions in controlled time sequence as a series of X-ray exposures are made.

INVENTORS
JOHN W. SMIT
WILLIAM R. SALT
BY
Watts, Hoffmann, Fisher & Heinke
ATTORNEYS.

X-RAY FILM CHANGER HAVING A STORAGE CHAMBER WITH A WALL WHICH PIVOTS AS CASSETTES ARE FED THERETO

CROSS REFERENCE TO RELATED APPLICATIONS

The following pending application for U.S. Letters Pat. is cross referenced herein: application of Frank H. Umberg and Cecil K. Bridgeman, Ser. No. 433,251, now Pat. No. 3,348,042 filed Feb. 10, 1965, and entitled FILM PACK.

BACKGROUND OF THE INVENTION

This invention relates to roentgenograph and more particularly to a film changer and methods of changing film for taking a series of radiographs, especially in rapid sequence and in timed relation.

In studying the circulation in the human body, and especially in the study and investigation of the brain, an opaque dye or other medium is injected into the circulatory system and a radiographs are taken in timed sequence as the dye progresses through the circulatory system. For optimum results, photographs must be taken rapidly and at precise intervals. This is accomplished by the use of film cassettes which are rapidly changed as a series of radiographs is taken. In such a technique, it is important that the film cassettes be changed quickly, smoothly and reliably.

SUMMARY OF THE INVENTION

The film changer of the present invention is adapted to handle film in individual cassettes or film holders. The changer automatically positions a cassette for exposure of the film, transfers it after exposure, and moves a successive cassette into position for the next radiograph. The preferred embodiment is especially adapted to handle vacuum cassettes of X-ray film of the type described and claimed in the copending application of Frank H. Umberg, and Cecil K. Bridgeman, Ser. No. 433,251, filed Feb. 10, 1965, entitled FILM PACK. As described in the said copending application, a sheet of X-ray film is sandwiched between intensifier plates in an evacuated, light tight, plastic pouch. A lead barrier behind the film in the cassette allows the cassettes to be used in a stack while the film in the top cassette is exposed.

The film changer of the present invention is constructed so that the film can be exposed and changed with the changer oriented either horizontally or vertically. As a result, two changers can be operated as a pair, so that radiographs of a patient can be taken from two directions without moving the patient or the X-ray apparatus. In addition, the film changer is constructed so that the timed sequence and interval between successive radiographs can be controlled by a card programmer of other suitable input. This permits the operation of the changer to be coordinated with the automatic control of a syringe for injecting dye into the circulatory system of the patient being X-rayed.

When the plastic evacuated cassettes described in the above-referenced copending application, or similar but nonevacuated cassettes, are used with the apparatus of this invention, one modification as compared with the disclosure of the referenced application is required. That is, since the cassettes here are presented in a stack with the top one of that stack exposed, it is necessary that either each cassette contain a lead sheet to prevent exposure of any film below that cassette in the stack, or that alternate ones of the stack of cassettes contain lead sheets with the remainder containing film and intensifying screens.

In that situation where two changers are used concurrently, the normal procedure is to expose film alternately in one changer and then the other. Thus, if one changer is horizontal and the other vertical, first a vertical exposure will be made and then a horizontal and so on.

As an example, when a vertical exposure is being made, scatter radiation from that exposure may partially expose a sheet of film in the horizontal changer. Because of this scatter radiation problem where two changers are used, it is desirable to provide a stack of cassettes in which alternate cassettes contain lead sheets and the remaining cassettes contain film and intensifier screens. Thus, as a vertical exposure is made, a lead sheet will be at the top of the pile in the horizontal changer. After the vertical exposure is made, both the exposed vertical film and the lead in the horizontal changer are fed out of the exposure positions in the two changers. A cassette with a lead sheet then moves to the top of the pile in the vertical changer and a cassette containing a film and intensifier screens moves to the top of the pile in the horizontal changer.

The basic arrangement of the film changer utilizes a side-by-side loading and unloading mechanism. A stack of X-ray film cassettes is provided in the loading mechanism and biased against an X-ray window. One-by-one the cassettes are automatically exposed, transferred in a controlled time sequence by a reciprocating feeding arm and power driven roller feed to an unloading station, and the stack is advanced to position a successive cassette for exposure.

One of the outstanding features of this invention is the utilization of a substantial biasing force which presses a stack of unexposed cassettes toward the exposure station. This biasing force clamps the stack of cassettes together with the top one of the stacks, when the stack is vertically disposed, in the exposed position and under substantially biasing force which compresses the intensifying screen and film together in tighter intimate contact than has heretofore been available in film changers. This better intimate contact, and therefore better resolution of the image produced on the X-ray film, is obtained even when the plastic cassette identified in the above-identified cross-referenced application is not evacuated.

The use of this substantial spring pressure produces yet another advantage. This other advantage is that for any given space, because of the compactness of the vacuum cassette and the elimination of spring or other clamping means in each cassette, the cassettes are thinner and therefore more films can be disposed in any given space.

A further important feature of the film changer is the automatic removal of biasing pressure against the stack of cassettes when each cassette is transferred. The biasing force is then reestablished on the stack before the subsequent cassette is exposed to X-rays. This advances the next cassette into the exposed position and assures the outstanding filter-screen contact obtained with this device.

The release of pressure, coordinated with the movement of the feed arm and the driven roller, produces an extremely short transfer time for changing the cassette and film, which facilitates rapid sequence radiographs at speeds exceeding the change times previously obtainable.

Accordingly, it is an object of this invention to provide a novel and improved film changer and method for rapidly and reliably positioning and transferring a series of film cassettes for exposure to X-rays.

Other objects, features and advantages of this invention will become apparent as the invention becomes better understood from the detailed description that follows, when considered in conjunction with the accompanying drawings.

DESCRIPTION OF THE PREFERRED EMBODIMENT

General Arrangement

Figure 1:
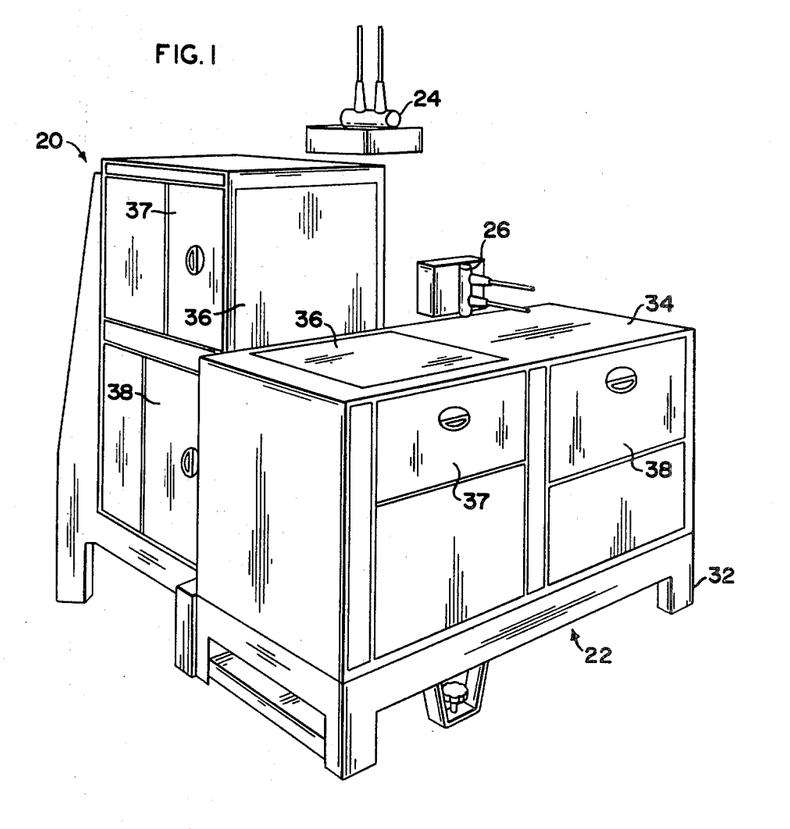
FIG. 1 is a diagrammatic perspective view showing two film changers constructed in accordance with the present invention, one oriented horizontally and the other vertically, and arranged adjacent each other to facilitate radiographing a patient in two directions without moving the patient.

The general appearance and overall arrangement of a film changer constructed in accordance with the present invention for exposing and changing successive film cassettes is shown in FIG. 1 of the drawings. For illustrative purposes, two changers indicated generally at 20 and 22 are shown. The construction is such that the film changers can be oriented either vertically as shown at 20, or horizontally as shown at 22. If desired, they can be located adjacent each other, as shown in FIG. 1, to provide for their concurrent use with two X-ray tubes 24, 26 for taking radiographs of a patient from two directions.

The mechanism of each film changer is contained within a housing 30 of suitable metal sheet with reinforcing frame members and which can be supported on a suitable base 32. One surface 34 of the housing 30 is provided with an opening covered by an X-ray transparent plate 35, defining an X-ray station 36 where the patient is positioned. Two side-by-side doors 37, 38 are provided in each s side of the housing 30. The door 37 and its counterpart on the opposite side of the housing provide access to a loading chamber beneath the plate 35 which receives a supply of X-ray film cassettes to be exposed in succession. The door 38 and its counterpart on the opposite side of the housing open into an unloading chamber that is to one side of the loading chamber when the changer is horizontal, and that is beneath the loading chamber when the changer is vertical. Cassettes with exposed film are removed from the film changer through the doors 38.

Figure 2:
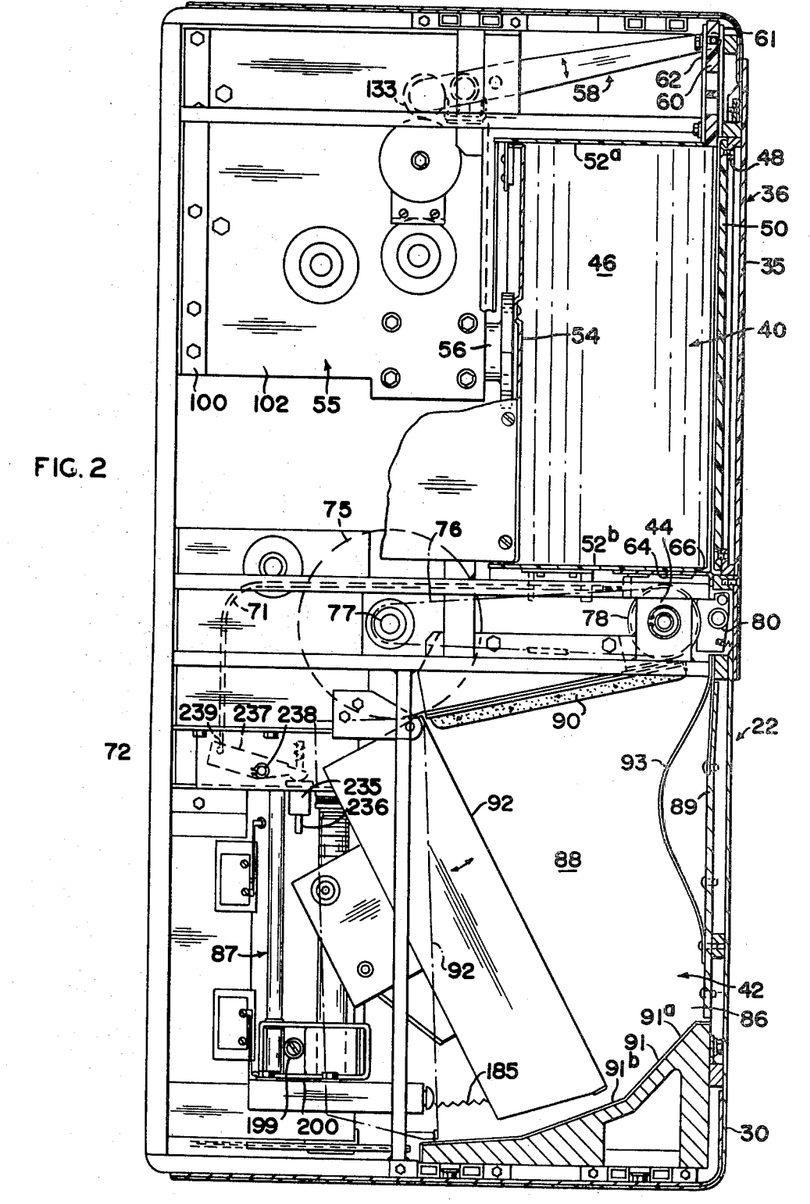
FIG. 2 is a vertical, longitudinal, sectional view, on an enlarged scale, of the vertical film changer of FIG. 1, illustrating the internal construction and arrangement.
Figure 3:
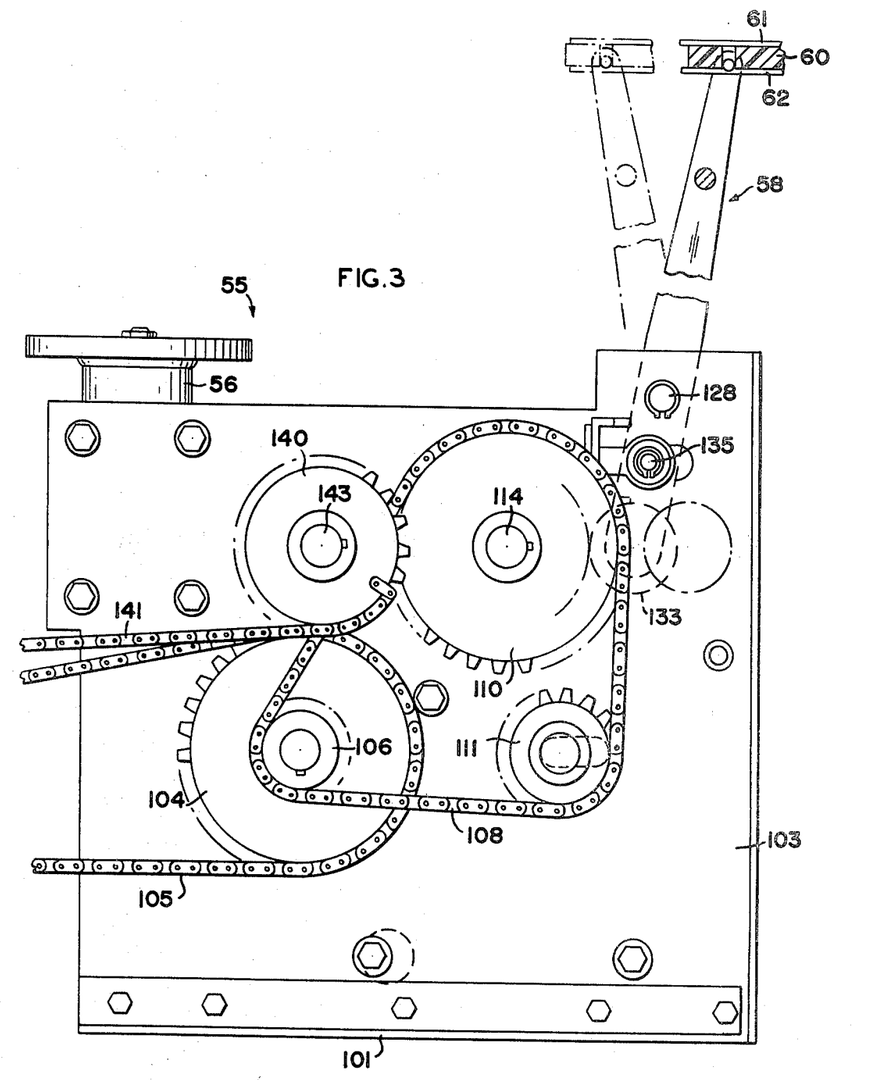
FIG. 3 is an elevational view, on an enlarged scale, of a control and feeding mechanism assembly as viewed from the rear side of the changer.

The internal construction and arrangement of the film changer 22 is shown in FIG. 2 of the drawings. The film changer comprises a loading chamber assembly 40 beneath the X-ray station 36, and an unloading chamber assembly 42 to one side thereof in the horizontal orientation shown. The loading and unloading chambers are separated by a transfer roller 44 adjacent the top of the housing 30.

The loading chamber assembly 40 holds a supply of film cassettes 46 which are successively exposed to X-rays and transferred to the unloading chamber assembly 42. The top of the loading chamber 40 includes an opening 48 in the housing 30 for interchangeable X-ray grids or plates. The opening is covered by the plate 35. A bottom locating plate 50 also covers the opening 48, within the loading chamber assembly 40 and spaced from the top cover plate 35. The bottom plate 50 is X-ray transparent and acts as a pressure plate at the X-ray station against which the cassettes 46 are urged. This plate locates the X-ray film being exposed in a desired plane close to the patient. Internal sidewalls 52, two of which are shown at 52a, 52b in FIG. 2, provide a housing that aligns and guides the cassettes 46 in proper location beneath the bottom locating plate 50. A loading platform 54 completes the housing for the cassettes 46 and is movable within the sidewalls 52 toward and away from the bottom locating plate 50. The loading platform 54 urges the cassettes 46 against the bottom plate 50 and moves successive cassettes into proper location for exposure.

A control mechanism assembly indicated generally by the reference numeral 55 is located within the loading chamber assembly 40, beneath the stack of cassettes 46 and loading platform 54. The control mechanism assembly 55 controls the feeding of cassettes 46 from the loading chamber assembly 40 to the unloading chamber assembly 42 and, in addition, controls the overall sequence of the film changer operation. A tube 56, reciprocably movable by the mechanism assembly 55, extends from the assembly 55 and is attached to the loading platform 54. The mechanism assembly 55 moves the tube 56 and loading platform 54 in a controlled manner to advance and bias cassettes 46 against the bottom plate 50. It also withdraws the tube 56 and platform 54 slightly to remove the biasing force when an exposed cassette is transferred into the unloading chamber assembly. A feed arm indicated generally at 58 extends from the control mechanism assembly 55 to one side of the stack of the cassettes 46, adjacent one end of the housing 30. A distal end of the feed arm 58 is connected with a feed finger 60 reciprocable between upper and lower guide plates 61, 62 in the plane of a cassette 46 adjacent the bottom plate 50. Oscillation of the feed arm 58 reciprocates the feed fingers 60 within the upper and lower guide plates 61, 62, and pushes an exposed cassette 46 toward the feed roller 44 to transfer the cassette. The control mechanism assembly 55 is described in more detail subsequently.

Figure 10:
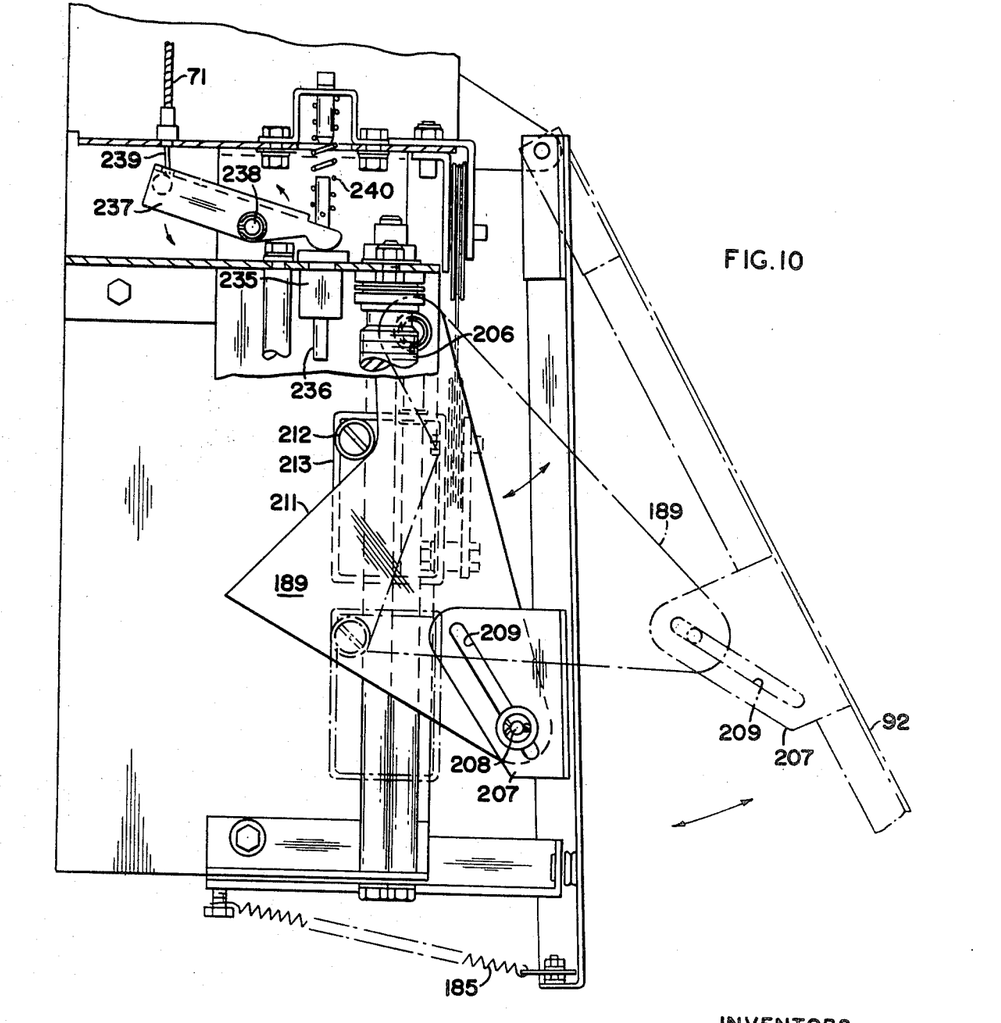
FIG. 10 is a side elevational view similar to FIG. 9, with parts in section and other parts removed.

A shutter assembly 64, shown in FIG. 2 and in more detail in FIG. 10, cooperates with a slot opening 66, providing a passageway for cassettes 46 from the loading chamber assembly 40 to the transfer roller 44. The shutter assembly 64 includes a shutter plate 68 slidably retained by a plate 69 against the outside surface of the inner transverse sidewall 52b that forms a housing for the cassettes 46. A bracket 70 is welded to the shutter plate 68 and receives the end of a flexible cable 71. Movement of the shutter plate 68 to selectively open or close the shutter openings 66 is accomplished through the cable 71 by a shutter actuating mechanism 72, shown in FIG. 2 and associated with the unloading chamber assembly 42. In a manner that will be described in more detail below, the shutter plate 68 is opened after film cassettes 46 are loaded into the loading chamber assembly 40 so that the cassettes may be transferred to the unloading chamber assembly 42 during operation.

Figure 11:
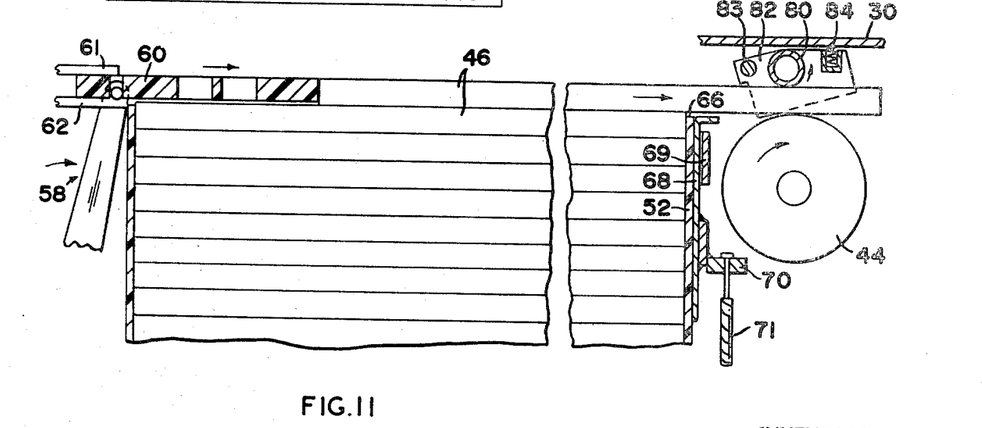
FIG. 11 is a partial sectional view of the loading chamber assembly, illustrating the manner in which a film a cassette is fed to the unloading chamber assembly.

The film cassette transfer roller 44 is located just outside of the housing for the cassettes 46, formed by the walls 52, and is parallel to and at the level of the shutter opening 66. Thus, the roller 44 extends transversely across the housing 30, and receives cassettes 46 as they are pushed through the shutter opening 66 by the feed arm 58, in a manner illustrated in FIG. 11. The roller 44 is driven by an electric motor 75 (FIG. 2) through a belt 76 connected between a motor pulley 77 and a roller pulley 78. During operation, the roller 44 is constantly driven by the motor 75 in a clockwise direction as show shown in FIGS. 2 and 11. A hold down roller 18 is spaced from and extends a parallel to the roller 44 so that a cassette 46 passing through the shutter aperture 66 can pass between the roller 44 and the hold down roller 80. The hold down roller 80 is supported in side brackets 82 pivoted at 83. Compression springs 84 carried by each bracket 82 push against the inner surface of the housing 30, biasing the hold down roller 80 toward the transfer roller 44 and urging cassettes 46 into frictional engagement with the transfer roller 44 when they are being transferred to the unloading chamber assembly. As best shown in FIG. 2, the end brackets 82 position the hold down roller 80 initially spaced from the transfer roller 44 a distance sufficient to receive a cassette 46 when the cassette is moved through the shutter aperture 66.

The unloading chamber assembly 42 on the opposite side of the transfer roller 44 from the loading chamber assembly 40 receives exposed film cassettes 46 as they are exposed and transferred during operation. The unloading chamber assembly 42 includes an upper receiving chamber 86 into which the cassettes 46 are delivered and a lower tilting mechanism 87 that changes the configuration of the chamber 86 when the film changer is oriented vertically.

The chamber 86 is formed by the sidewalls of the housing 30, one of which is shown at 88 in FIG. 2, and (in the orientation of FIG. 2) by a top wall 89, a left sidewall 90, a right sidewall 91, and a lower wall formed by a platform 92 connected with the tilting mechanism 87. The platform 92 is shown in a tilted position to show the associated mechanism beneath the platform. When the changer is used horizontally, as illustrated in FIG. 2, the platform is maintained in the position shown in phantom. Preferably, the walls 89, 90 and 91 are constructed of sound deadening material to minimize noise from the transfer of cassettes into the unloading chamber assembly. A deflector 93 formed of a strip of spring metal is attached to the top wall 89 and curved to intersect the path in which cassettes move from the transfer roller 44 into the chamber 86. The deflector 93 directs the cassettes toward the receiving platform 92.

When the film changer 22 is oriented vertically, as illustrated by the changer 20 in FIG. 1, wall 91 forms the lower wall of the chamber 86. The wall 91 is formed of three flat segments 91a, 91b, 91c angularly related to each other and to the receiving platform 92 so that when the platform 92 is tilted as shown is full line in FIG. 2 and progressively moved to the position shown in phantom, the wall segments will be approximately right angles to the platform 92. With this construction, when the changer is oriented vertically, cassettes received in the chamber 88 will be supported by the wall segments 91a, b, c and rest in an upright but slightly inclined position against the tilting platform 92. During operation, the platform 92 is pivoted from an initial inclined position shown in solid line in FIG. 2 to a final vertical position shown in phantom in FIG. 2 as successive cassettes are received in the chamber 86. The receiving platform 92 is pivoted by the tilting mechanism 87 in a manner that will be described, to assure a orderly arrangement of cassettes in a generally vertical position when the changer is vertical.

Control Mechanism Assembly

The construction of the control mechanism assembly 55 is best shown in 3 to 7 of the drawings. Spaced parallel angle members 100, 101 (FIG. 4) anchor spaced parallel supporting plates 102, 103 to the frame work of the housing 30 of the film changer. Various drive, cam and pivot shafts forming the mechanism assembly 55 are journaled in the spaced supporting plates 102, 103.

Figure 4:
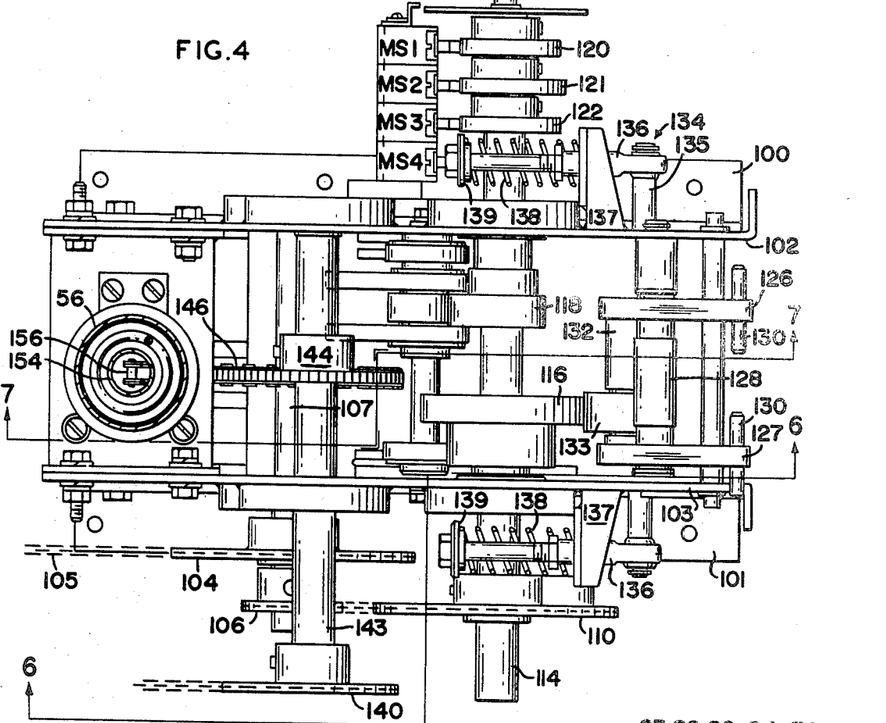
FIG. 4 is a top plan view of the assembly of FIG. 3.
Figure 5:
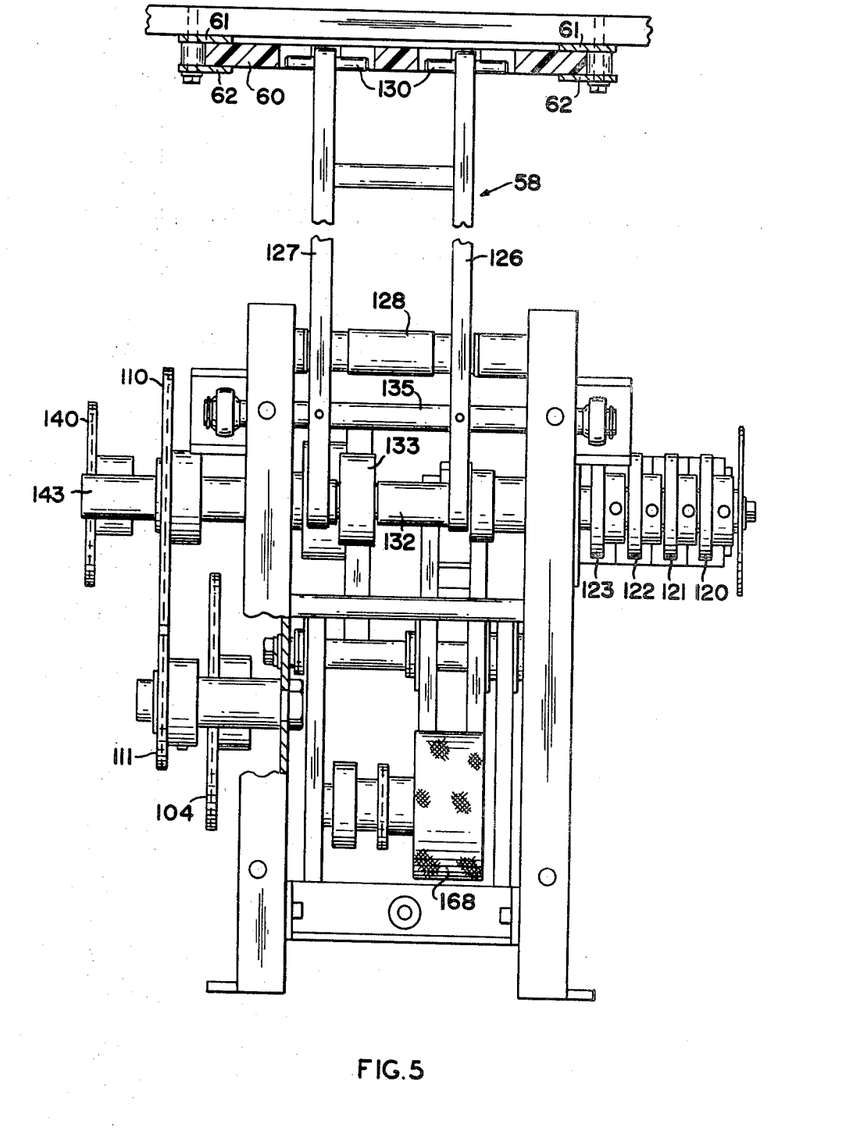
FIG. 5 is an end elevational view of the assembly of FIGS. 3 and 4.
Figure 6:
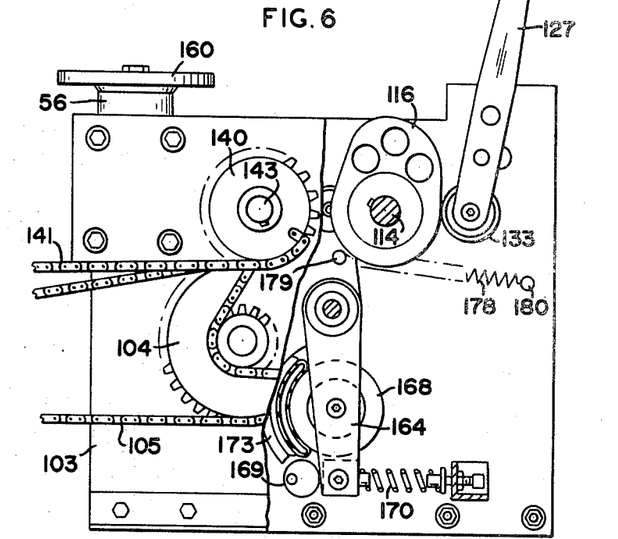
FIG. 6 is a side elevational and sectioned view of the assembly of FIGS. 3 and 4 as seen from the planes indicated by the line 6—6 of FIG. 4.

A driven sprocket 104 receives power through a chain 105 from a power drive and clutch mechanism (not shown). The driven sprocket 104 and a reducer sprocket 106 are supported for rotation by a sprocket shaft 107 supported by plates 102, 103. Power from the sprocket 104 is transmitted by the reducer sprocket 106 through a chain 108 to a cam shaft drive sprocket 110. An idler sprocket 111 provides adjustment to maintain the chain 108 under tension.

The cam shaft drive sprocket 110 is keyed to a cam shaft 114 extending through the supporting plates 102, 103 and journaled for rotation in the plates. A feed cam 116 for operating the feed arm 58, and a pressure release cam 118 for operating the loading platform 54 are secured to the cam shaft 14 between the spaced supporting plates 102, 103. Four control cams 120, 121, 122, 123 are secured to the cam shaft 114 to the outside of the plate 102. These four cams control four associated microswitches MS1, MS2, MS3, MS4, which control the operation of the film changer.

The feed arm 58 operated by the feed cam 116 is comprised of two elongated feed bars 126, 127 extending parallel to each other from the control mechanism assembly 55 to a position adjacent the upper and lower guide plates 61, 62, as shown in FIG. 2. The two feed bars 126, 127 are fixed to a pivot shaft 128 journaled in the supporting plate 102, 103. A cross pin 130 extends through the upper end of each of the feed bars 126, 127 and engages the feed finger 60 shown in FIGS. 2, 3, 5 and 10. The opposite ends of the feed bars 126 are connected by a follower shaft 132 that journals a cam follower 133, which follows feed cam 116.

A feed bar return mechanism 134 (FIG. 4) biases the feed bars 126, 127 to a position where the feed finger 60 is withdrawn, as shown in FIG. 2. The return mechanism 134 includes a cross bar 135 extending through both feed bars 126, 127 just beneath the pivot shaft 126 128. A link 136 is pivotally secured to each opposite end of the cross bar 135. Each passes through a bracket 137 extending from opposite sides of the mechanism assembly 55. A portion of each link 136 that extends through the respective bracket 137 is surrounded by a compression spring 138 that is compressed between the bracket 137 and a flange 139 at the end of each link 136. The springs 138 are further compressed when the feed cam 116 pivots the feed arm 58 to advance a film cassette to the transfer roller 44. As the feed cam 116 continues to rotate, the compression springs 138 bias the feed arm 58 so that the follower 133 continue continues to follow the feed cam and at the same time pivot the feed arm to a withdrawn position.

From the above construction, it will be apparent that rotation of the feed cam 116 rocks the two feed bars 126, 127 comprising the feed arm 58 to cause the feed finger 60 to reciprocate back and forth within the upper and lower guide plates 61, 62.

A power input sprocket 140 carried by the control mechanism assembly 55 is provided to retract the loading platform assembly 54 when driven through a chain 141 by a plate loading motor (not shown). The sprocket 140 drives a sprocket shaft 143 to which a chain supply sprocket 144 is fixed between the spaced supporting plates 102, 103. One end of a chain length 146 (FIG. 7) is secured to the chain supply sprocket 144, and the chain is wrapped around a portion of the sprocket periphery. The opposite end of the chain 146 is secured to the movable tube 56 that forms part of the loading platform assembly 54.

The tube 56 is slidable in a mounting sleeve 150 that is secured between the spaced supporting plate 102, 103 and that encircles the tube 148 near the upper end. A fixed tube guide 152 is fixed near the base of the control mechanism assembly 55 and slidably engages the inner surface of the movable tube 56 so that the tube telescopes around the guide 152. An inner tubular member 154 extends from the fixed tube guide 152 concentrically within the movable tube 56 and is shorter in length. The chain 146 is fastened by a connecting rod 156 within the tube 56 to the upper end adjacent the loading platform 54. The chain 146 extends through a central opening 158 in the fixed tube guide 152 and extends through the inner tubular member 154. A coil spring 159 encircles the inner tubular member 154 and extends between the fixed tube guide 152 and a top plate 160 of the movable tube 148. The spring 159 biases the movable tube 56 away from the fixed tube guide 152 so that the tube tends to extend from the control mechanism assembly 55 in a direction toward the plates 49 and 50 of the loading chamber assembly.

The chain 146 is entrained about a fixed sprocket beneath the fixed tube guide 152, and about a floating sprocket 163 rotatably supported by a stud shaft 162 on an arm 164, which is supported at one end by a pivot shaft 165. A brake drum 168 is secured to the floating sprocket 163 for rotation with the sprocket about the stud shaft 162. The distal end of the pivoted arm 164 is biased against a stop 169 by a compression spring 170.

A second arm 172 is pivoted midway between its ends on the pivot shaft 165. The end of the second arm 172 adjacent the brake drum 168 supports a brake pad 173 that prevents rotation of the brake drum 168 and floating sprocket 163 when the pad is biased against the drum. A cam follower 176 is rotatably secured to the opposite end of the second pivoted arm 172 and follows the pressure release cam 118. The cam follower 176 is biased against the cam 118 by a tension spring 178 secured by pins 179 and 180 connected to the arm 172 and supporting plate 103, respectively.

Figure 7:
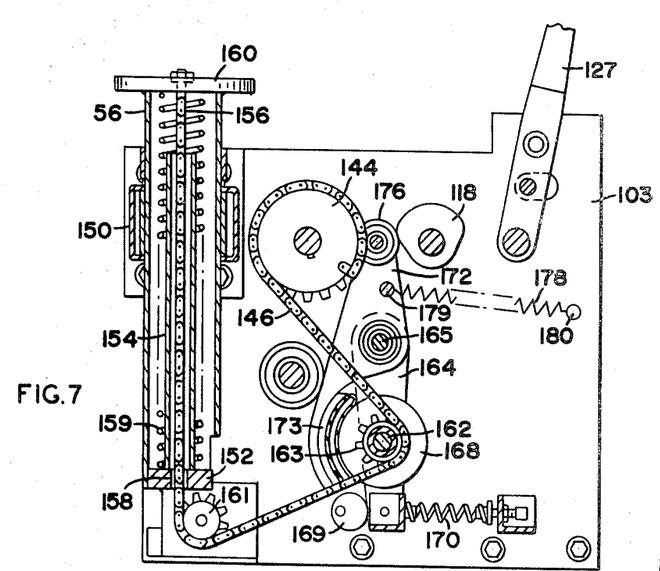
FIG. 7 is a sectional view of the mechanism assembly of FIGS. 3 and 4 as seen from the planes indicated by the line 7—7 of FIG. 4.

When the cam 118 is rotated counterclockwise to where the lobe of the cam pivots the arm 172 in a counterclockwise direction as shown in FIG. 7, the brake pad 173 presses against the brake drum 168 preventing rotation of the brake drum 168 and floating sprocket 163. The cam 118 further pivots the arm 172 against the biasing spring 170, exerting tension on the chain length 146 connected to the movable tube 56. Movement of the arm 172 pulls on the chain 146 and draws the movable tube 56 and loading platform 54 away from the top and bottom plates 35, 50 of the loading chamber assembly. This movement is against the biasing force of the spring 159 and the magnitude of the movement is small. It is sufficient, however, to relieve the pressure forcing the cassettes against the bottom plate 50 of the loading chamber assembly so that the feed finger 60 can easily push a cassette 46 through the shutter opening 66 to the transfer roller 44. The lobe on the cam 118 is long enough to maintain the arm 172 pivoted long enough to afford time for a cassette to be removed from the loading chamber assembly by the transfer roller 44. Upon further rotation of the cam, the spring 178 will bias the arm 172 in a clockwise direction, removing the brake pad 173 from the brake drum 168. As a result, the chain 146 is movable and the spring 159 within the movable tube 56 is free to bias the tube 56 and loading platform 54 in a direction toward the top plate 35 and bottom plate 50 of the loading chamber assembly. This biasing of the spring 159 and the ability of the movable tube 56 to slide in the mounting sleeve 150 forces the remaining cassettes 46 toward the bottom plate 50 where the next in the stack of cassettes is in a position to be exposed and then transferred to the unloading chamber assembly.

Tilting Mechanism of the Unloading Assembly

Figure 8:
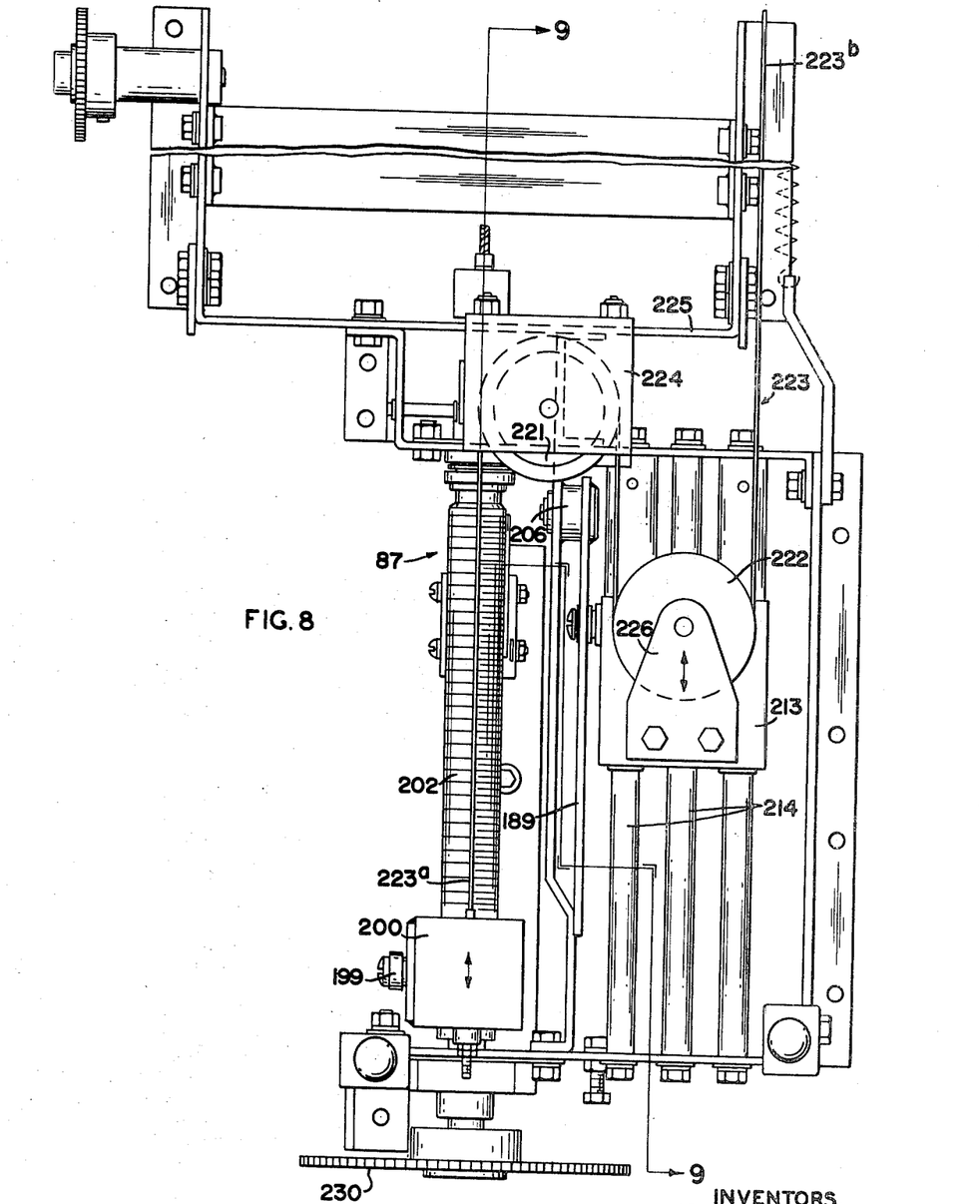
FIG. 8 is a front elevational view of the unloading chamber assembly with parts removed.
Figure 9:
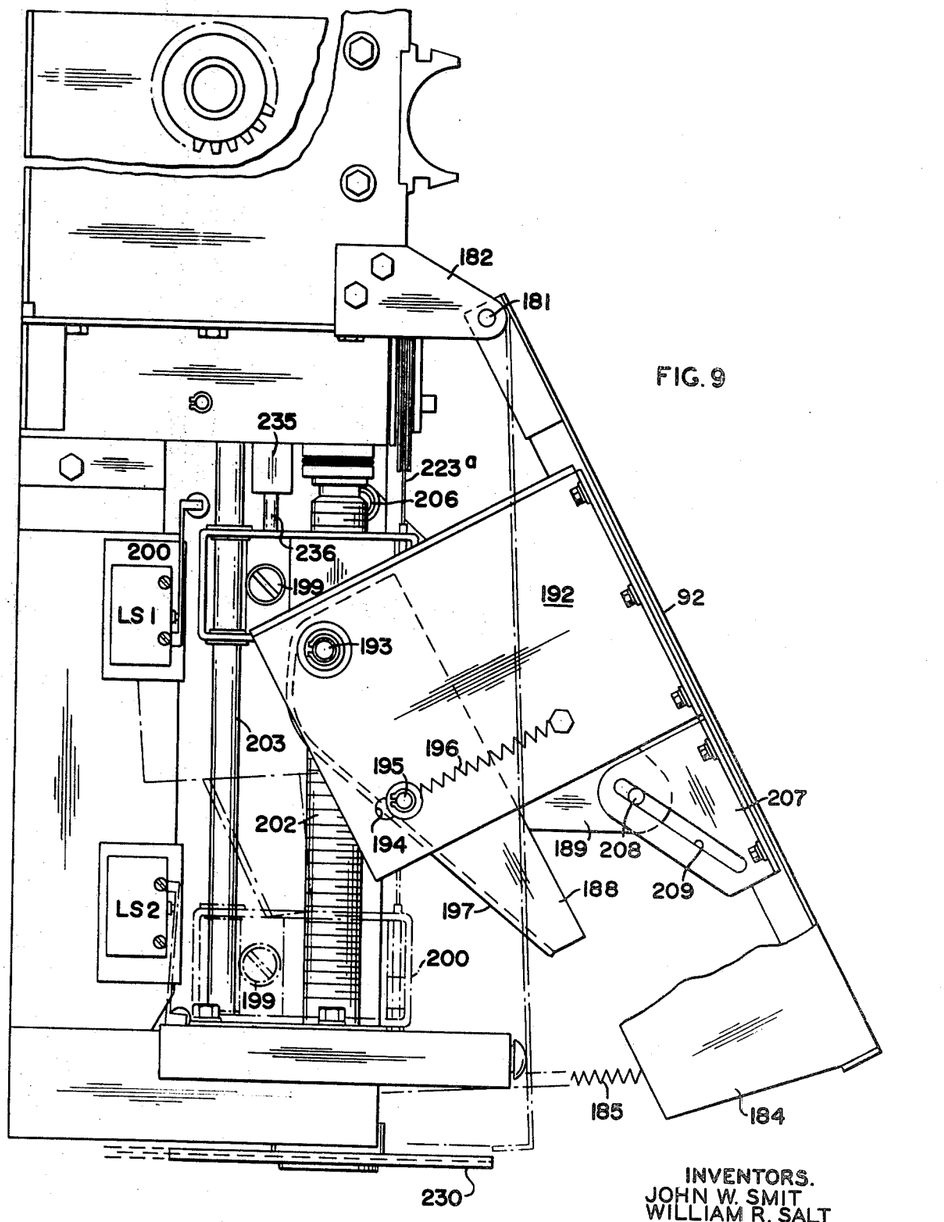
FIG. 9 is a side elevational view of the tilting mechanism of the unloading chamber assembly.

The tilting mechanism 87 associated with the tilting platform 92 is best illustrated in FIGS. 8 to 10 of the drawings. As already mentioned, the platform 92 is tilted to change its position during operation of the film changer when the changer is in a vertical orientation. The purpose of varying the angle at which the platform 92 extends is to assure an orderly arrangement of exposed film cassettes at the receiving station. The platform 92 is positioned at an angle as shown in FIG. 9 when the chamber 86 is relatively empty, and is gradually moved to a vertical position as cassettes are received in the chamber 86. The cassettes each rest with a lower edge along the segmented wall 91 and lean against the inclined platform 92. As the platform 92 moves to a vertical position, the cassettes move with it by gravity along the supporting wall 91 to provide additional space for subsequently received cassettes.

The platform 92 is secure secured within the unloading chamber assembly 42 by pivot pins 181 on opposite sides and at one end of the platform 92. The pivot pins are supported in spaced bracket plates 182 secured to the housing. A peripheral flange 184 surround the platform 92 and extends to the rear of the platform. A tension spring 185 extend extends between the platform 92 to the frame of the housing, biasing the platform to a vertical position in the orientation of FIG. 9.

A first cam plate 188 and a second cam plate 189 are connected with the platform 92 and extend generally perpendicular to the plane of the platform. The first cam plate 188 is used to move the platform 92 to a inclined or tilted position as shown in FIG. 9. The second cam plate 189 controls the movement of the platform 92 back to a perpendicular position as shown in solid line in FIG. 10 of the drawings.

As best shown in FIG. 9, the first cam plate 188 is pivotally secured to a support plate 192 extending to the rear and perpendicular to the platform 92. The cam plate 188 is pivoted about a stud shaft 193 for limited movement as provided by a short slot 194 in the support plate 192. A pin 195 extending from the cam plate 188 passes through the slot 194. A tension spring 196 biases the cam plate 188 to the position shown in FIG. 9. A cam surface 197 of the cam plate 188 engages a cam follower 199 on a first movable carriage 200 that is reciprocated up and down in the orientation of FIG. 9 a by a screw 202 and guided by a rod 203. When the carriage 200 is driven by the screw 202 from its lower position to its upper position, the follower 199 acts against the cam surface 197 to tilt the platform 92 from the phantom position of FIG. 9 to the solid line position. When the carriage 200 reaches the upper limit of its travel, the follower 199 leaves the cam surface 197 of the first cam plate 188, and the platform 92, insofar as the carriage 200 is concerned, is free to pivot from the tilted position back to the vertical position. However, it is limited by the second cam plate 189.

The second cam plate 189 is pivoted at an upper end in the orientation of the FIGS. 8 to 10 on a pivot 206. An opposite end of the second cam plate 189 is connected to a plate 207 on the platform 92, by a slide pin 208 that rides in an elongated slot 209 of the plate 207. A cam surface 211 best shown in FIG. 10 of the drawings cooperates with the cam follower 212 of the second movable carriage 213 that is freely slidable vertically in the orientation of FIG. 10 along three supporting rods 214 (see FIG. 8). The vertical position of the cam follower determines the angular position of the platform 92. Due to the contour of the cam surface 211, movement of the second s carriage 213 from a lower position to an upper position allows the platform 92 to progressively pivot about the mounting pivot pin 181 from an inclined position as shown in phantom in FIG. 10 to a vertical position as shown in full line.

Movement of the second carriage 213 from a lower position to an upper position FIGS. 3 the orientation of FIGS. 8 to 10, is accomplished by pulleys 221 and 222, and a cable 223, as best shown in FIG. 8. The pulley 221 is supported by a bracket 224 on a frame member 225 of the film changer. The pulley 222 is secured for rotation on the top of the second carriage 213 by a bracket 226. One end 223a of the cable 223 is secured to the first carriage 200. The cable loops about both pulleys 221 and 222 and extends from pulley 222, as indicated at 223b to the loading platform 54 of the loading chamber assembly 40. While the attachment of the cable portion 223b to the loading platform 54 is not show, it will be understood that it is secured so that the movement of the loading platform 54 toward the bottom plates 50 at the X-ray station as film cassettes are exposed and transferred, will pull on the cable 223 and effectively shorten it with respect to the tilting mechanism 87.

As best shown in FIG. 10, with the second carriage 213 and pulley 222 in a upper position in the orientation as shown, the cam follower 212 and cam plate 189 have allowed the platform 92 to be returned to a vertical position by the spring 185. With the second carriage 213 in a lower position as indicated in phantom, the cam follower 212 and cam plate 189 hold the platform 92 in a tilted or inclined position.

From FIGS. 8 to 10 and the above description, it will be understood that movement of the first carriage 200 from the lower position of FIG. 8 to the upper position will cause the platform 92 to be inclined to the full line position of FIG. 9 and will effectively lengthen the cable 223 to allow the second carriage 213 to slide along the supporting rods 214 to a lower position under the influence gravity. While the first carriage 200 remains in its upper position, the loading platform 54 is gradually moved toward bottom plate 50 at the X-ray station as successive film cassettes 46 are exposed and transferred to the unloading chamber assembly. This progressively decreases the effective length of the cable 223 with respect to the tilting mechanism 87, and raises the second carriage 213 along the supporting rods 214.

As shown in FIGS. 8 and 9, the drive screw 202 for the first carriage 200 is driven by a chain sprocket 230. The sprocket 230 is driven in either of two desired directions by a chain and electric motor (not shown). The motor is reversible and its operation is controlled by the two pairs of doors 37, 38 of the housing 30. When two doors 37, 38 on either side of the housing are opened to unload the cassettes from the unloading chamber assembly and to reload the loading chamber assembly, the sprocket 230 is driven to move the first carriage 200 from the upper position to the lower position where it is shown in FIGS. 8 and 9. This movement of the carriage 200 pulls with it the cable 223 and resets the loading platform 54, pulling it away from the bottom plate 50 against the biasing force of the compression spring 159 within the movable tube 148. Thus, with the changer vertical and the tilting mechanism operating, it is not necessary to reset the loading platform with the sprocket 140 and plate loading motor, although the chain must be rewound about the sprocket, either by the motor or other suitable means. Alternatively, the movement of the carriage 200 can merely take up slack in the cable 223 if the loading platform is reset by rotation of the sprocket 140 of the control mechanism assembly.

After cassettes 46 are placed in the loading chamber 40, the loading chamber door 37 is closed. Closing the door 37 on either side of the housing operates the drive motor for the sprocket 230 in the opposite direction so that the sprocket 230 and the screw 202 drive the carriage 200 to the upper position. The drive for sprocket 230 is stopped by limit switches LS1 and LS2 whenever the carriage 200 reaches an upper or lower position.

A plunger operator 235 is secured to the frame of the film changer at the upper end of the travel of the carriage 200. See FIGS. 2 and 9. A plunger rod 236 is biased by a spring 240 to extend from the plunger operator and is moved upward in the orientation of FIG. 9 and to the left in the orientation of FIG. 2 by the carriage 200. Movement of the rod 236 pivots an arm 237 about a supporting pivot pin 238. This slides a wire 239 within the cable 71 to slide the connected shutter plate 68 in a direction that uncovers the slot opening 66 so that film cassettes 46 can be transferred from the loading chamber assembly to the unloading chamber assembly. When the carriage 200 is moved from upper position to a lower position after the cassettes 46 have been transferred to the unloading chamber assembly, the spring return 240 pivots the arm 237 and closes the opening 66 by moving the shutter plate 68 over the opening. The shutter plate 68 assures that the cassette nearest the bottom plate 50 will not slide through the opening 66 during loading before the loading platform applies pressure to the cassettes. Once the loading and unloading doors 37, 38 are closed and the cassettes 46 are pressed between the loading platform 54 and the bottom plate 50, the shutter plate 68 can be withdrawn, as it is when the carriage 200 moves from the upper position to the lower position.

Operation

The four microswitches MS1, 2, 3, 4 in part control the sequence of operation of the film changer. The switch MS3 controls the exposure of the film cassettes by controlling the operation of an associated X-ray tube. Switch MS4 actuates a clutch-brake unit on the power input to the sprocket 104. Switch MS1 is a safety switch, and switch MS2 controls a backup timer that terminates the X-ray exposure if it is not already terminated when the next cycle of the film changer begins. This protects against an operator setting an exposure time on an associated exposure control mechanism which is longer than the frequency of cassette movement as controlled by a preselected program.

The power input to the chain 105 and sprocket 104 of the operating mechanism assembly 55 is under the control of a suitable clutch and brake so that rotation and power input to the operating mechanism assembly can be controlled. A cycle of operation occurs each time the cam shaft 114 rotates through 360 degrees. During this rotation, a film cassette 46 is exposed to X-rays to produce a radiograph, is transferred to the unloading chamber assembly 42, and is replaced by a subsequent cassette. The external drive for the sprocket 104 is periodically energized by an external control, for example, by a suitable program as might be provided by a punched card indicating the number of radiographs to be taken and time delay between successive radiographs. The program can also control the exposure time and the injection of dye into the patient.

During each cycle when the cam shaft 114 is rotated, the loading platform 54 biasing the cassettes 46 against the bottom plate 50 is moved a slight distance away from the bottom plate 50 by the pressure release cam 118 to remove the clamping pressure holding the cassettes in firm position. The feed arm 58 is then oscillated by the feed cam 116 and the cassette 46 adjacent the bottom plate 50 of the housing 30 is moved by the feed finger 60 through the shutter opening 66. The continuously rotating transfer roller 44 engages the cassette which is forced into frictional engagement with the transfer roller by the hold down roller 80. Rotation of the transfer roller 44 carries the cassette into the unloading chamber 42 where it is deflected by the deflector spring 93 and received on the unloading platform 92. The feed arm 58 then oscillates back to its original position and the pressure release cam 118 releases the loading platform 54 to push successive cassettes against the bottom plate 50 and force the film into tight intimate contact with the associated intensifying screens.

At this time, the cam 122 actuates the microswitch MS3, which is electrically associated with a circuit controlling the X-ray tube. Actuation of the switch MS3 initiates exposure of the X-ray film cassette positioned against the bottom plate 50 of the film changer. Rotation of the cam shaft 114 is stopped by the actuation of microswitch MS4 by the cam 123.

With the film changer oriented horizontally, the shutter opening 66 need not be closed by the shutter plate 68. In addition, the tilting mechanism 87 need not be operated.

When the film changer is oriented vertically, the tilting mechanism 87 is operated to control the tilting platform 92 in the unloading chamber assembly 42. Considering the operation after one load of cassettes has been exposed and transferred to the unloading chamber assembly, the opening of a door 37 and a door 38 to the loading and unloading chambers actuates switches that energize a drive motor connected with the sprocket 230 to run the carriage 200 to its lower position. This closes the shutter plate 68, retracts the loading platform 54 from the bottom plate 50 to provide space for additional cassettes in the loading chamber assembly. Cassettes are unloaded from the unloading chamber assembly and new cassettes are placed in the loading chamber.

Closing of the loading door 37 energizes the motor driving sprocket 230 in an opposite direction, running the carriage 200 to the upper position. This moves the unloading platform 92 to an inclined position, increases the effective length of the cable 223 so that the carriage 213 moves to a lower position, and moves the shutter plate 68 to an open position. As cassettes are successively exposed and transferred in the manner previously described, the effective length of the cable 223 is decreased, raising the carriage 213 from its lower position toward an upper position. The inclined platform 92 is progressively returned to a vertical position as successive cassettes are fed into the unloading chamber 86.

While a preferred construction and mode of operation of the film changer of this invention has been described in detail, it will be understood that various modifications or alternations may be made therein without departing from the spirit or scope of the invention, as set forth in the appended claims.

We claim:

1. A film changer for use in taking a series of radiographs, said film changer comprising:
   a. structure defining an X-ray station including means to locate a cassette containing film at the X-ray station for exposure to X-rays;
   b. a film cassette supply and transfer mechanism for changing film at the X-ray station, including:
      i. means supporting a plurality of film cassettes for movement to the X-ray station;
      ii. means applying a force to bias the cassettes toward the X-ray station during exposure of the film to X-rays;
      iii. means to temporarily relieve the force biasing the cassettes toward the X-ray station; and
      iv. means to move a cassette at least partially from the X-ray station while the force biasing the cassettes is temporarily relieved,
   c. structure defining a station for receiving cassettes transferred from the X-ray station, including a pivotal wall for supporting cassettes transferred to the receiving station; and
   d. means to progressively pivot said wall as cassettes are transferred to the receiving station.

2. A film changer as defined in claim 1 including a movable carriage at the receiving station, means connecting the movable carriage and the pivoted wall so movement of the carriage controls pivoting of the wall, and a connection between the film cassette supply and transfer mechanism and the carriage so that the carriage is moved as cassettes are transferred from and supplied to the X-ray station.

3. A film changer as defined in claim 2 including another carriage, means to drive the said carriage independently of the first carriage to pivot the wall and to move the means supporting the film cassettes away from the X-ray station when the film changer is reloaded.

4. In a method of feeding a series of film cassettes to an X-ray station, and thence to a receiving station, the steps comprising:
 a. applying a force to a plurality of cassettes to urge the plurality toward an X-ray station;
 b. exposing film in one cassette of the plurality to X-rays at the X-ray station while applying said force;
 c. relieving the force urging the plurality of cassettes toward the X-ray station after the film has been exposed;
 d. while the force is relieved removing the cassette with the exposed film from the X-ray station by initially pushing it from an initial position at the X-ray station in a generally vertical, downward, direction and then engaging it and conveying it from the X-ray station to a receiving station;
 e. applying another force to move the remaining cassettes of the stack toward the X-ray station;
 f. receiving the cassette in a generally upright position and supporting it against an upright support; and
 g. progressively changing the angle at which the upright support is oriented as successive cassettes are received.

5. A film changer for use in taking a series of radiographs, said film changer comprising:
 a. structure defining an X-ray station at which film cassettes are exposed to X-rays;
 b. means to supply cassettes to the X-ray station;
 c. transfer means to move exposed cassettes from the X-ray station;
 d. a receiving station for receiving exposed cassettes transferred from the X-ray station, said receiving station including a pivotally movable wall member; and
 e. means to progressively change the angle of the wall member as cassettes are transferred to the receiving station.

6. A film changer as set forth in claim 5 wherein the means to progressively change the angle of the wall member as cassettes are transferred is controlled by the means to supply cassettes to the X-ray station.

7. A film changer as set forth in claim 6 including first and second cam plates extending from the wall member in planes that intersect the pivotal axis of the wall, first and second carriages movable relative to the pivot axis, each along a plane of one of the cam plates, a first cam follower on the first carriage engageable with the first cam plate, a second cam follower on the second carriage engageable with the second plate, means to independently drive the said first carriage to move the first cam follower along the first cam to pivot the wall member from a first position to a second position, a spring biasing said wall member from said second position toward said first position, and means associated with the cassette supply means to control movement of said second carriage and second cam follower progressively along the second cam as cassettes are transferred from the X-ray station to the receiving station to allow the wall member to return to the first position.

8. A film changer as set forth in claim 7 including a movable shutter between the X-ray station and the receiving station, and means actuated by the first carriage when it moves to tilt the wall member, to open the shutter and permit film cassettes to be transferred.

9. A film changer as set forth in claim 6 including a movable carriage reciprocable to control pivoting of the wall member.

10. In a method of transferring a series of film cassettes in a generally upright orientation from an X-ray station to a receiving station the steps comprising:
 a. moving a series of cassettes one after the other from an upper location at an X-ray station to a lower location away from the X-ray station along a predetermined path;
 b. receiving the cassettes at the lower location in a generally upright position;
 c. maintaining the cassettes supported generally upright with a pivoted wall oriented generally upright; and
 d. pivoting the wall from an initial inclined position to a position more toward the vertical as cassettes are moved from the upper location to the lower location.

11. The method of claim 10 wherein the wall is pivoted each time a successive cassette is transferred to provide an enlarged zone in which to accommodate additional cassettes.